Dec. 13, 1932.   W. G. HALL ET AL   1,890,781
PUMP JACK
Filed July 26, 1930
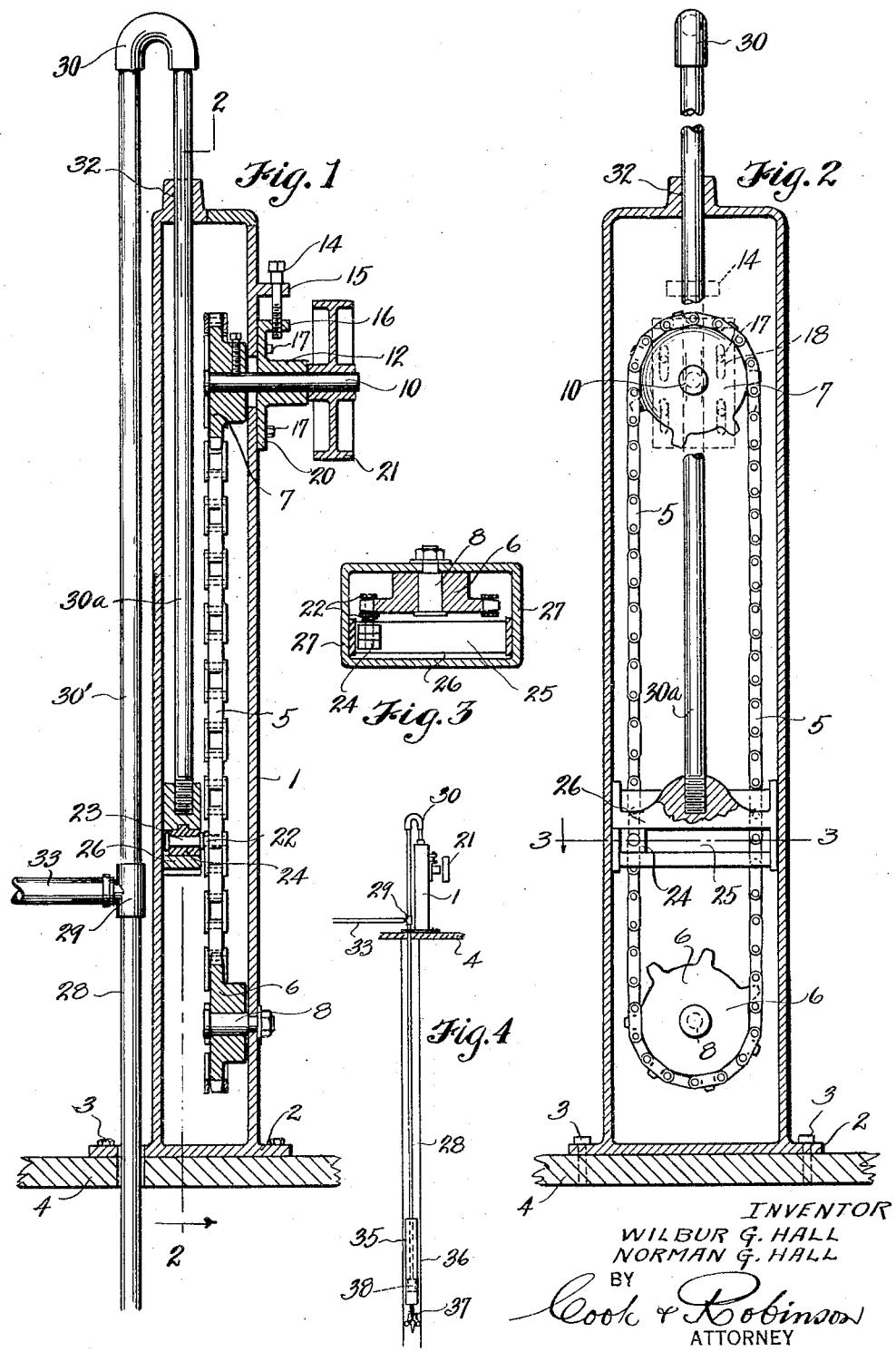
INVENTOR
WILBUR G. HALL
NORMAN G. HALL
BY
Cook & Robinson
ATTORNEY Patented Dec. 13, 1932

1,890,781

UNITED STATES PATENT OFFICE

WILBUR G. HALL AND NORMAN G. HALL, OF PORT ANGELES, WASHINGTON; SAID NORMAN G. HALL ASSIGNOR TO SAID WILBUR G. HALL

PUMP JACK

Application filed July 26, 1930. Serial No. 470,789.

This invention relates to improvements in pumps and it has reference in particular to a pump lift mechanism, or what may be termed a "pump jack"; the principal object of the invention being to provide simple, durable and satisfactory means for producing a pumping stroke of considerable length.

It is also an object of this invention to provide a pump jack especially desirable for wells of considerable depth, and which may be operated with a minimum amount of power.

More specifically stated, the invention resides in the provision of a pump jack embodying a vertically traveling, continuous chain belt operating about a pair of sprocket wheels, one of which sprockets is driven; there being a cross head vertically movable within a guide housing containing the chain belt, and operatively connected with a link of the chain so that, as the belt travels about the sprockets, the cross head moves upwardly and downwardly in accordance therewith, also there being a lift rod connected with the cross head for connection with, and for actuating the piston of the pump cylinder.

Other objects of the invention reside in the various details of construction and in the combination of parts, and in their mode of operation, as will hereinafter be described.

In accomplishing these and other objects of the invention, we have provided the improved details of construction, the preferred forms of which are illustrated in the accompanying drawing, wherein—

Fig. 1 is a central, vertical sectional view of a pump jack constructed according to the present invention.

Fig. 2 is a vertical section in a plane substantially on the line 2—2 in Fig. 1.

Fig. 3 is a horizontal section on line 3—3 in Fig. 2.

Fig. 4 is a view ilustrating the pump jack as connected with the piston of the pump cylinder.

Referring more in detail to the drawing—

1 designates, in its entirety, an elongated, vertical housing of rectangular form in horizontal cross section, as shown in Figure 3, and provided at its lower end with a base flange 2 through which bolts or the like 3 may be extended to secure the housing rigidly to a foundation 4. Operatively supported within the housing is a vertically traveling, continuous chain belt 5 extended about lower and upper sprocket wheels 6 and 7. The sprocket wheel 6 is rotatable on a stud bolt 8 fixed in the inner wall 9 of the pump housing and the upper sprocket wheel is fixed on a supporting and driving shaft 10 rotatably mounted in a bearing 12 that is adjustably fixed to the housing wall. Adjustment of this bearing, for the purpose of tightening or loosening the chain belt, is effected by turning an adjusting bolt 14 which is rotatable in a lug 15 projecting from the housing and at its end is threaded into an outwardly turned flange 16 at the upper end of the bearing. A plurality of bolts 17 are extended through vertical slots 18 in the bearing base flange 20 and are threaded into the housing wall and may be tightened to retain the bearing fixed at any position to which it is adjusted.

At the outer end of shaft 10 is a pulley wheel 21 over which a belt may be extended to drive the shaft.

Interposed in the chain belt 5 is a an attachment link 22 including a lateral stud 23 on which a block 24 is mounted; this block being slidable in a horizontal slot 25 in a cross head 26 that is vertically reciprocable between the opposite side walls 27—27 of the housing and which will be carried upwardly and downwardly in accordance with the movement of the attachment link of the chain belt as the belt travels about the sprocket wheels.

It will be here stated that, in the present illustration, the pump jack is primarily designed for use in connection with a pump mechanism as disclosed in the pending application of Norman G. Hall, filed on the 3rd day of January, 1928, under Serial Number 244,313, in which the sucker rod, or lift rod which actuates the pump piston, is tubular and serves as the means through which water is delivered from the pump cylinder to the surface incident to reciprocation of the piston in its cylinder. In the present instance, the sucker pipe or tube is designated by reference numeral 28 and is connected at its lower end to the pump piston and at its upper end is connected by a T-fitting 29 with one leg 30' of a U-shaped section 30 which has its other leg 30a slidable through an opening 32 in the upper end of the housing and connected at its lower end centrally with the cross head 26.

In Fig. 4, the pump cylinder is designated at 35 and it is fixed against movement in the well casing 36 by a device at 37. The pump piston 38 is attached to pipe 28.

With this arrangement, upward and downward reciprocal travel of the cross head causes a similar upward and downward travel of the pipe 28 to actuate the pump piston and effect the pumping action whereby water is caused to be delivered through the pipe to the fitting 29 and discharged. We have here shown fitting 29 to have connection with a flexible hose 34 through which water is carried to its point of use.

While we have illustrated the pump jack as being operated by means of the belt wheel 21, it is readily apparent that various driving means may be provided, such as through suitable gearings on the shaft 10 in connection with an electric motor, or to any suitable type of engine. It is contemplated in some instances that the driving motor may be supported by a bracket directly from the pump casing and operatively connected through suitable reduction gearing with the pump shaft. It also is contemplated providing suitable means whereby a wind mill may be connected to actuate the jack through suitable connection with the shaft 10.

We also have in mind using the jack as a wind mill head. In such instance, the jack would be rotatably supported and the wind mill wheel would be cammed by the shaft 10, or indirectly connected thereto. It is not intended that the jack be confused in its use to pumps of the type shown, but that it be applied to any type of pump employing a reciprocable pumping element; it being apparent that the length of the stroke may be made as long or as short as desired by adjustment of the sprockets from or toward each other.

It is readily apparent that various details of construction and combination of parts might be alternated without departing from the spirit of the invention, and for this reason, we do not desire that the claim be limited only to the details illustrated, but that it shall cover the device in a measure commensurate with the scope of the invention disclosed.

The present housing insures protection against damage by the chain and gearing and it makes possible the operating of the parts in an oil bath so that wear on the parts is reduced to a minimum.

Having thus described our invention what we claim as new therein and desire to secure by Letters Patent, is:

In combination, a pump cylinder having a piston, a hollow pipe for actuating the piston, and a pump jack comprising a housing, a bearing in the upper end of the housing, a cross head vertically reciprocable therein, a pipe fixed in the cross head and extending slidably through the bearing and connected at the outside of the housing with the piston actuating pipe and connected with said piston actuating pipe, a pair of sprocket wheels vertically spaced in the housing, means for driving the sprockets, a chain belt extended about the sprockets and an attachment link in the chain through which operative connection is provided with the cross head and whereby it is reciprocated incident to travel of the belt about the sprockets.

Signed at Port Angeles, Washington this 8th day of July, 1930.

WILBUR G. HALL.
NORMAN G. HALL.